United States Patent [19]

Morimoto et al.

[11] Patent Number: 4,747,021

[45] Date of Patent: May 24, 1988

[54] ELECTROLYTIC CAPACITOR

[75] Inventors: Takeshi Morimoto; Toshiya Matsubara; Yoshiki Hamatani; Shigeo Komatsu, all of Yokohama, Japan

[73] Assignees: Asahi Glass Company Ltd., Tokyo; Elna Company Ltd., Fujisawa, both of Japan

[21] Appl. No.: 83,973

[22] Filed: Aug. 11, 1987

[30] Foreign Application Priority Data

Aug. 15, 1986 [JP] Japan .................................. 61-190613
Sep. 30, 1986 [JP] Japan .................................. 61-229761

[51] Int. Cl.$^4$ ............................................. H01G 9/02
[52] U.S. Cl. ..................................... 361/433; 252/62.2
[58] Field of Search ........................... 252/62.2, 567; 361/433 A, 433 E, 433 L

[56] References Cited

U.S. PATENT DOCUMENTS

| 4,024,442 | 5/1977 | Anderson | 361/433 E |
| 4,469,610 | 9/1984 | Fukuda et al. | 361/433 E X |
| 4,522,737 | 6/1985 | MacNamee | 252/62.2 |

FOREIGN PATENT DOCUMENTS

| 2844069 | 4/1979 | Fed. Rep. of Germany | 252/62.2 |
| 112713 | 9/1981 | Japan | 252/62.2 |

Primary Examiner—Donald A. Griffin
Attorney, Agent, or Firm—Oblon, Fisher, Spivak, McClelland & Maier

[57] ABSTRACT

An electrolytic capacitor comprising a capacitor element and an electrolyte impregnated to the element, wherein the electrolyte comprises benzoic acid or its salt and an aliphatic saturated dibasic carboxylic acid having an odd number of carbon atoms or its salt.

11 Claims, No Drawings

ELECTROLYTIC CAPACITOR

BACKGROUND OF THE INVENTION

1. Field of the Invention

The present invention relates to an electrolytic capacitor. More particularly, it relates to an electrolytic capacitor wherein a novel electrolyte is used.

2. Discussion of the Background

An electrolytic capacitor having a capacitor element prepared by rolling foils of a valve metal such as aluminum together with a separator, usually has a structure wherein an electrolyte is impregnated to the capacitor element, and such a capacitor element is accomodated and sealed in a metal casing such as an aluminum casing or in a casing made of a synthetic resin.

In such an electrolytic capacitor, it has been common to employ an electrolyte comprising ethylene glycol as the main solvent and boric acid or an aliphatic dibasic carboxylic acid such as adipic acid or decanedibasic carboxylic acid or an ammonium salt thereof as the solute, as an electrolyte for an intermediate or high voltage capacitor (working voltage of 100 V or higher).

However, when boric acid is used, it is impossible to obtain high conductivity, and when an aliphatic dibasic carboxylic acid or its salt is employed, the deterioration in the properties of a electrolytic capacitor is remarkable under a high temperature condition of at least 100° C. Under the circumstances, it has been studied to employ aromatic carboxylic acids exhibiting excellent properties constantly under a high temperature condition. Among them, benzoic acid imparting a relatively high sparking voltage is suitable as a solute for an electrolyte for an intermediate voltage electrolytic capacitor, and an electrolyte having ammonium benzoate dissolved in ethylene glycol is known (Japanese Examined Patent Publication No. 8501/1977).

However, to secure a long useful life of an electrolytic capacitor under a high temperature condition, it is desirable not only to adjust the pH of the electrolyte to a level of from 5 to 7, but also to minimize the water content. If the pH is high or the water content is large, the electrode foils are likely to be corroded, whereby the properties of the capacitor tend to deteriorate, or a gas is likely to be generated to actuate a safety valve. On the other hand, if the water content is limited to a level of not larger than 5% or the pH is limited within a range of from 5 to 7, it will be impossible to obtain high conductivity with benzoic acid alone, whereby it is difficult to obtain a high performance electrolytic capacitor having a small loss (tan δ). Further, it is also known to use ammonium benzoate and ammonium succinate in combination (Japanese Examined Patent Publication No. 9340/1968). Succinic acid is durable up to a temperature of 85° C. However, when the temperature rises to 105° C., succinic acid undergoes thermal decomposition, and even if it is used in combination with benzoic acid, it is not durable for use for a long period of time. An electrolyte is also known wherein ammonium benzoate, boric acid and mannitol are dissolved in ethylene glycol as the solvent (Japanese Unexamined Patent Publication No. 60829/1982). The electrolyte of this system is said to show stability properties under a high temperature condition at a level of from 130° to 150° C., but it is difficult to obtain sufficiently high conductivity, and it is impossible to obtain an electrolytic capacitor having an adequately small loss (tan δ).

SUMMARY OF THE INVENTION

It is an object of the present invention to solve the above-mentioned various problems and to provide an electrolytic capacitor which is operable consistently for a long period of time under a high temperature condition of at least 100° C. and which has a minimum loss (tan δ).

The present invention provides an electrolytic capacitor comprising a capacitor element and an electrolyte impregnated to the element, wherein the electrolyte comprises benzoic acid or its salt and an aliphatic saturated dibasic carboxylic acid having an odd number of carbon atoms or its salt.

DETAILED DESCRIPTION OF THE PREFERRED EMBODIMENT

As the solvent for the electrolyte to be used for the present invention, any organic solvent which is commonly used for electrolytic capacitors, can be used. For example, N,N-dimethylformamide, N-methylformamide, γ-butyrolactone, N-methylpyrrolidone, ethylene glycol, an ethylene glycol monoalkyl ether, an ethylene glycol dialkyl ether, dimethylsulfoxide, propylene carbonate and ethylenecyanohydrin may suitably be used.

The salt of benzoic acid and of the aliphatic saturated dibasic carboxylic acid having an odd number of carbon atoms to be used in the present invention, is preferably an alkali metal salt or an amine salt, more preferably an ammonium salt or a quaternary ammonium salt, whereby the conductivity and the sparking voltage of the resulting electrolyte will be high. In the present invention, benzoic acid or its salt and the aliphatic saturated dibasic carboxylic acid having an odd number of carbon atoms or its salt are used preferably in amounts of from 5 to 15% by weight and from 0.5 to 8% by weight, respectively, in the electrolyte composition. If the amount of benzoic acid or the aliphatic dibasic carboxylic acid having an odd number of carbon atoms is less than the above range, no adequate conductivity will be obtained. On the other hand, if the amount exceeds the above range, precipitates are likely to form at room temperature.

As the alkaline source to control the pH of the electrolyte, ammonia or an alkylamine may suitably be employed. In order to obtain sufficiently high conductivity and sparking voltage, it is most preferred to employ ammonia. Ammonia may be added in the form of aqueous ammonia. However, it is preferred to incorporate it in the form of ammonium benzoate or an ammonium salt of the aliphatic saturated dibasic carboxylic acid having an odd number of carbon atoms constituting the electrolyte from the viewpoint of the control of the water content.

The water content of the electrolyte should preferably be small from the viewpoint of the useful life of the electrolytic capacitor, and is preferably not more than 5% by weight. The pH of the electrolyte is preferably controlled within a range of from 4 to 8, more preferably from 5 to 7. If the pH is higher or lower than this range, the electrode foils will be corroded.

The electrolytic capacitor of the present invention includes various types of capacitors. In a typical type, an aluminum foil anode and an aluminum foil cathode separated by a suitable separator such as paper, are used, and they are rolled into a cylindrical shape to obtain a capacitor element, and an electrolyte is impregnated to this capacitor element. The amount of the impregnated electrolyte is preferably from 50 to 300% by weight relative to the separator. The capacitor element impregnated with the electrolyte is accomodated and sealed in a casing made of a corrosion resistant metal such as aluminum, or a synthetic resin.

When the pH is adjusted to a level of from 5 to 7 and the water content is adjusted to a level of not higher than 5% in order to obtain a capacitor which is stable under a high temperature condition, benzoic acid has a limitation in the solubility, and it is difficult to obtain an electrolyte having sufficiently high conductivity by the use of benzoic acid alone. If it is dissolved in an amount close to its saturation, the sparking voltage will be low, and it becomes impossible to obtain a capacitor for 200 V.

When an aliphatic dibasic carboxylic acid of the formula $HOOC(CH_2)_nCOOH$ is added in order to increase the sparking voltage, the one wherein n is an even number, has a small solubility and can not be added in a sufficient amount to increase the voltage adequately. Whereas, the acid of the same formula wherein n is an odd number, has a high solubility, whereby the decrease in the sparking voltage is small, and when it is used in combination with benzoic acid, it is possible to obtain an electrolyte having high conductivity for a working voltage of from 200 to 250 V. The odd number represented by n is preferably from 3 to 21, more preferably from 3 to 15 in view of the solubility.

Now, the present invention will be described in further detail with reference to Examples and Comparative Examples. However, it should be understood that the present invention is by no means restricted to these specific Examples.

By using electrolytes having compositions as identified in Comparative Examples 1 to 5 and Examples 1 to 6, electrolytic capacitors prescribed for 200 V and 470 µF having aluminum electrodes, were prepared. The water contents (%) and pH of the electrolytes are shown in Table 1. The prescribed voltage was applied to these capacitors at 105° C., and the change in the loss (tan δ) upon expiration of 1,000 hours was measured. The results are shown in Table 1 (loading test). Further, the capacitors were stored at 105° C. without applying any voltage for 1,000 hours, and then the change in the leakage current was measured. The results are shown in Table 1 (non-loading test). The values for the initial and after 1,000 hours for the non-loading test presented in Table 1 are those measured after one minute from the application of the prescribed voltage to the respective capacitors.

|  |  | wt % |
| --- | --- | --- |
| Comparative Example 1 | Ammonium adipate | 4 |
|  | Adipic acid | 3 |
|  | Water | 3 |
|  | Ethylene glycol | 90 |
| Comparative Example 2 | Ammonium benzoate | 15 |
|  | Water | 7 |
|  | Ethylene glycol | 78 |
| Comparative Example 3 | Ammonium benzoate | 10 |
|  | Benzoic acid | 5 |
|  | Water | 3 |
|  | Ethylene glycol | 82 |
| Comparative Example 4 | Ammonium benzoate | 10 |
|  | Succinic acid | 4 |
|  | Water | 3 |
|  | Ethylene glycol | 83 |
| Comparative Example 5 | Ammonium benzoate | 8 |
|  | Boric acid | 2 |
|  | Mannitol | 3 |
|  | Ethylene glycol | 87 |
| Example 1 | Ammonium benzoate | 10 |
|  | Ammonium glutarate | 4 |
|  | Water | 3 |
|  | Ethylene glycol | 83 |
| Example 2 | Ammonium benzoate | 10 |
|  | Glutaric acid | 4 |
|  | Water | 3 |
|  | Ethylene glycol | 83 |
| Example 3 | Ammonium benzoate | 10 |
|  | Ammonium pimelate | 4 |
|  | Water | 3 |
|  | Ethylene glycol | 83 |
| Example 4 | Ammonium benzoate | 10 |
|  | Pimelic acid | 4 |
|  | Water | 3 |
|  | Ethylene glycol | 83 |
| Example 5 | Ammonium benzoate | 10 |
|  | Ammonium azelate | 4 |
|  | Water | 3 |
|  | Ethylene glycol | 83 |
| Example 6 | Ammonium benzoate | 10 |
|  | Azelaic acid | 4 |
|  | Water | 3 |
|  | Ethylene glycol | 83 |

TABLE 1

|  | Electrolyte | | Loading test (Change in tan δ) (200 V, 105° C.) | | Non-loading test (Change in leakage current) (µA) | |
| --- | --- | --- | --- | --- | --- | --- |
|  | Water content (%) | pH | Initial | After 1,000 hrs | Initial | After 1,000 hrs |
| Comparative Example 1 | 3.4 | 6.1 | 0.036 | 0.049 | 15.9 | 410 |
| Comparative Example 2 | 7.5 | 7.8 | 0.030 | Safety value actuated in all capacitors | 14.3 | — |
| Comparative Example 3 | 3.2 | 6.1 | 0.037 | 0.039 | 14.1 | 330 |
| Comparative Example 4 | 3.3 | 6.0 | 0.031 | Safety value actuated in | 19.7 | — |
| Comparative Example 5 | 3.0 | 5.9 | 0.038 | 0.040 | 13.9 | 250 |
| Example 1 | 3.4 | 6.9 | 0.029 | 0.030 | 14.1 | 320 |
| Example 2 | 3.2 | 6.1 | 0.030 | 0.030 | 14.0 | 220 |
| Example 3 | 3.1 | 6.8 | 0.031 | 0.031 | 14.2 | 240 |
| Example 4 | 3.0 | 6.2 | 0.032 | 0.032 | 14.1 | 230 |
| Example 5 | 3.2 | 6.7 | 0.032 | 0.032 | 14.1 | 230 |
| Example 6 | 3.1 | 6.1 | 0.033 | 0.033 | 14.2 | 220 |

By using electrolytes having compositions as identified in Comparative Examples 6 to 11 and Examples 7 to 10, electrolytic capacitors prescribed for 250 V and 220 μF having aluminum electrodes, were prepared. The water contents (%) and pH of the electrolytes are shown in Table 2. The prescribed voltage was applied to these capacitors at 105° C., and the change in the loss (tan δ) upon expiration of 1,000 hours was measured. The results are shown in Table 2 (loading test). Further, the capacitor were stored at 105° C. without applying any voltage for 1,000 hours, and then the change in the leakage current was measured. The results are shown in Table 2 (non-loading test). The values for the initial and after 1,000 hours for the non-loading test presented in Table 1 are those measured after one minute from the application of the prescribed voltage to the respective capacitors.

|  |  | wt % |
|---|---|---|
| Comparative Example 6 | Ammonium adipate | 4 |
|  | Adipic acid | 3 |
|  | Water | 3 |
|  | Ethylene glycol | 90 |
| Comparative Example 7 | Ammonium benzoate | 10 |
|  | Benzoic acid | 5 |
|  | Water | 3 |
|  | Ethylene glycol | 82 |
| Comparative Example 8 | Ammonium benzoate | 10 |
|  | Succinic acid | 4 |
|  | Water | 3 |
|  | Ethylene glycol | 83 |
| Comparative Example 9 | Ammonium benzoate | 8 |
|  | Boric acid | 2 |
|  | Mannitol | 3 |
|  | Ethylene glycol | 87 |
| Comparative Example 10 | Ammonium benzoate | 11 |
|  | 1,10-decanedicarboxylic acid | 3 |
|  | Water | 3 |
|  | Ethylene glycol | 83 |
| Comparative Example 11 | Ammonium benzoate | 11 |
|  | Sebacic acid | 3 |
|  | Water | 3 |
|  | Ethylene glycol | 83 |
| Example 7 | Ammonium benzoate | 11 |
|  | Nonanedicarboxylic acid | 3 |
|  | Water | 3 |
|  | Ethylene glycol | 83 |
| Example 8 | Ammonium benzoate | 7 |
|  | Benzoic acid | 3 |
|  | Ammonium nonanedicarboxylate | 4 |
|  | Water | 3 |
|  | Ethylene glycol | 83 |
| Example 9 | Ammonium benzoate | 11 |
|  | Ammonium undecanedicarboxylate | 3 |
|  | Water | 3 |
|  | Ethylene glycol | 83 |
| Example 10 | Ammonium benzoate | 11 |
|  | Ammonium tridecanedicarboxylate | 2 |
|  | Water | 3 |
|  | Ethylene glycol | 84 |

TABLE 2

| Electrolyte | Electrolyte Water content (%) | pH | Loading test (change in tan δ) (200 V, 105° C.) | | Non-loading test (Change in leakage current) (μA) | |
|---|---|---|---|---|---|---|
|  |  |  | Initial | After 1,000 hrs | Initial | After 1,000 hrs |
| Comparative Example 6 | 3.4 | 6.1 | 0.035 | 0.046 | 8.1 | 230 |
| Comparative Example 7 | 7.3 | 7.8 | Impossible to prepare | | | |
| Comparative Example 8 | 3.2 | 6.1 |  |  |  |  |
| Comparative Example 9 | 1.8 | 5.9 | 0.038 | 0.039 | 6.7 | 120 |
| Comparative Example 10 | Precipitates formed at room temperature | | | | | |
| Comparative Example 11 | | | | | | |
| Example 7 | 3.1 | 6.8 | 0.028 | 0.031 | 6.9 | 150 |
| Example 8 | 3.2 | 6.2 | 0.030 | 0.030 | 6.8 | 110 |
| Example 9 | 3.0 | 6.4 | 0.035 | 0.037 | 6.7 | 120 |
| Example 10 | 3.1 | 6.5 | 0.036 | 0.039 | 6.5 | 115 |

According to the present invention, it is possible to obtain electrolytic capacitors having excellent high temperature stability with a minimum change in the loss (tan δ) under a high temperature loading condition of 100° C. or higher.

What is claimed is:

1. An electrolytic capacitor comprising a capacitor element and an electrolyte impregnated to the element, wherein the electrolyte comprises benzoic acid or its salt and an aliphatic saturated dibasic carboxylic acid having an odd number of carbon atoms or its salt.

2. The electrolytic capacitor according to claim 1, wherein the electrolyte comprises from 5 to 15% by weight of benzoic acid or its salt and from 0.5 to 8% by weight of the dibasic carboxylic acid or its salt.

3. The electrolytic capacitor according to claim 1, wherein the salt of benzoic acid is ammonium benzoate.

4. The electrolytic capacitor according to claim 1, wherein the salt of the dibasic carboxylic acid is an ammonium salt.

5. The electrolytic capacitor according to claim 1, wherein the electrolyte has a water content of not higher than 5% by weight.

6. The electrolytic capacitor according to claim 1, wherein the electrolyte has a pH of from 4 to 8.

7. The electrolytic capacitor according to claim 1, wherein the electrolyte is impregnated in an amount of from 50 to 300% by weight relative to a separator of the capacitor element.

8. The electrolytic capacitor according to claim 1, wherein the dibasic carboxylic acid has the formula $HOOC(CH_2)_nCOOH$ wherein n is an odd number of from 3 to 21.

9. The electrolytic capacitor according to claim 8, wherein the dibasic carboxylic acid or its salt is glutaric acid, pimelic acid or azelaic acid, or an ammonium salt thereof.

10. An electrolytic capacitor comprising a capacitor element and an electrolyte impregnated to the element, wherein the electrolyte comprises a polar solvent, from 5 to 15% by weight of benzoic acid or ammonium benzoate, from 0.5 to 8% by weight of an aliphatic saturated dibasic carboxylic acid of the formula $HOOC(CH_2)_nCOOH$ wherein n is an odd number of from 3 to 21 or an ammonium salt thereof, and not higher than 5% by weight of water.

11. The electrolytic capacitor according to claim 10, wherein the electrolyte has a pH of from 5 to 7.

* * * * *